United States Patent
Panhoelzl et al.

(10) Patent No.: US 10,041,852 B2
(45) Date of Patent: Aug. 7, 2018

(54) DEVICE FOR SENSING A PRESSURE OF A FLUID MEDIUM

(71) Applicant: Robert Bosch GmbH, Stuttgart (DE)

(72) Inventors: Bernhard Panhoelzl, Weinstadt (DE); Daniel Etter, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/622,906

(22) Filed: Jun. 14, 2017

(65) Prior Publication Data

US 2018/0003582 A1  Jan. 4, 2018

(30) Foreign Application Priority Data

Jun. 29, 2016 (DE) .................. 10 2016 211 704

(51) Int. Cl.
*G01L 19/14* (2006.01)
*G01L 9/00* (2006.01)
*G01L 19/00* (2006.01)

(52) U.S. Cl.
CPC .......... *G01L 19/143* (2013.01); *G01L 9/0048* (2013.01); *G01L 19/0069* (2013.01)

(58) Field of Classification Search
CPC .................................... G01L 7/08; G01L 7/00
USPC .......................................................... 73/753
See application file for complete search history.

(56) References Cited

U.S. PATENT DOCUMENTS

| 6,536,286 B1* | 3/2003 | Moyer | G01L 19/0069 |
| | | | 73/716 |
| 2006/0164203 A1* | 7/2006 | Mast | G01L 19/003 |
| | | | 338/68 |
| 2007/0245830 A1* | 10/2007 | Thuruthumaly | G01L 19/0007 |
| | | | 73/756 |
| 2009/0081963 A1* | 3/2009 | Boren | H01Q 1/002 |
| | | | 455/90.1 |
| 2010/0002745 A1* | 1/2010 | Stoll | G01D 11/245 |
| | | | 374/143 |
| 2011/0123261 A1* | 5/2011 | Stoll | G01D 11/245 |
| | | | 403/288 |
| 2015/0192478 A1* | 7/2015 | Rueth | G01L 9/00 |
| | | | 374/143 |
| 2017/0328798 A1* | 11/2017 | Petrucelli | G01L 19/147 |

FOREIGN PATENT DOCUMENTS

EP  1518099 A1  3/2005

* cited by examiner

*Primary Examiner* — Harshad R Patel
*Assistant Examiner* — Jamel Williams
(74) *Attorney, Agent, or Firm* — Norton Rose Fulbright US LLP; Gerard Messina

(57) ABSTRACT

A device is provided for sensing a pressure of a fluid medium, having a pressure-sensing element disposed in a sensor housing, the sensor housing having a first housing part provided with a pressure connector in the form of a metallic threaded part, and a second housing part provided with an electrical connection, the first housing part at least sectionally having an outer case formed as an external drive. The first housing part is injection-molded as a plastic injection-molded part onto the pressure connector.

21 Claims, 4 Drawing Sheets

DEVICE FOR SENSING A PRESSURE OF A FLUID MEDIUM

RELATED APPLICATION INFORMATION

The present application claims priority to and the benefit of German patent application No. 10 2016 211 704.1, which was filed in Germany on Jun. 29, 2016, the disclosure of which is incorporated herein by reference.

FIELD OF THE INVENTION

The present device relates to a device for sensing a pressure of a fluid medium.

BACKGROUND INFORMATION

Patent document EP 1 518 099 B1 discusses a generic device for sensing a pressure, which has a pressure-sensing element disposed in a sensor housing. The sensor housing has a first housing part which is formed as a plate-shaped metal part and whose outer case is provided as external drive for a screw-in tool having a hexagonal contour. A metallic pressure connector, provided with a pressure channel and an external thread, is joined to the first housing part by laser welding, for example. As pressure-sensing element, a metallic pressure-measuring cell is used which has a blind-hole-type inner channel that ends at a thin membrane. On the side of the membrane facing away from the blind-hole-type inner channel, a pressure sensor is disposed which detects a deformation of the membrane in response to an application of pressure. The pressure-measuring cell is mounted and welded on the pressure connector through an opening in the first housing part in such a way that the blind-hole-type inner channel is connected to the pressure channel of the pressure connector. A circuit element having an evaluation circuit is contacted to the sensor element, e.g., via bonding wires, and is stuck onto the first housing part within the sensor housing. The second housing part is formed as a male connector provided with electrical connections, and is produced as an injection-molded part from plastic. A joining part in the form of a deep-drawn, thin-walled, sheet-metal part is embedded with one end section in the plastic of the second housing part, and with the end section facing away from the second housing part, is mounted on the first housing part and welded to it at a circumferential contact surface with the aid of a laser. Spring contacts connect the electrical connections of the second housing part to the circuit substrate. Such devices are used, for example, as high-pressure sensors in automotive engineering, and have proven themselves there many times.

Because in the related art, the first housing part is in the form of a plate-shaped metal part, as a third component for the mechanical connection between the first housing part and the second housing part, a deep-drawn part is needed, which must be injected into the plastic of the second housing part. This is necessary in order to be able to produce the mechanical connection between the joining part and the metallic housing part by welding. If the joining part were omitted, the second housing part made of plastic would have to be joined to the metallic first housing part, necessitating costly joining structures on the first housing part. However, this is only possible in a very troublesome manner, since the first housing part is in the form of a plain plate-shaped metal part, on which joining structures can be formed only to a very limited extent. On the other hand, the formation of the first housing part as a plain plate-shaped metal part has the great advantage that the outer case of the first housing part represents a stable external drive for a screw-in tool in order to be able to screw the pressure connector, provided with a screw thread, into a pressure-measuring opening, assigned to the device, of a motor vehicle, for example.

SUMMARY OF THE INVENTION

An object of the present invention is to develop a cost-effective and versatilely usable alternative design approach which continues to ensure mechanical stability when screwing in the device.

The present invention provides that the first housing part be produced as a plastic injection-molded part, which is injection-molded onto the pressure connector.

The approach according to the present invention advantageously makes it possible to dispense with a costly joining part in the form of a deep-drawn part to be specially produced. Instead, the second housing part may be joined directly to the first housing part. This is achieved by injection-molding the first housing part as a plastic injection-molded part onto the pressure connector. In this manner, joining structures may be provided in an easy manner in the first housing part formed as an injection-molded part. In addition to reducing costs, for instance, this also permits the switchover from laser-welding methods to ultrasonic-welding methods for joining the two plastic housing parts, and a considerably more compact type of construction.

Advantageous specific embodiments and further developments of the present invention are made possible by the further features described herein.

Advantageously, the metallic pressure connector may be provided with a collar-like support section, which is embedded in the plastic of the first housing part. The support section provides mechanical stabilization, making it possible to support the torques occurring during the screwing-in process, and to guarantee a stable joint between the plastic of the first housing part and the pressure connector.

It is especially advantageous if, in a cross-sectional plane perpendicular to the screw-in direction of the pressure connector, the support section embedded in the plastic has a geometrical shape corresponding to the geometrical shape of the outer case, with a smaller diameter compared to the diameter of the outer case. In this instance, the torques transmitted by a screw-in tool onto the outer case, formed as external drive, of the first plastic housing part are absorbed by the geometric shape of the metallic support section lying directly under the plastic, and a shear-off of the first housing part from the pressure connector during the screwing-in process is reliably avoided.

Since the first housing part is formed of plastic as an injection-molded part, a side of the first housing part facing away from the pressure connector may easily be provided with an internal through-opening for receiving the pressure-sensing element.

It is especially advantageous that the side of the first housing part facing away from the pressure connector may be provided in an easy and inexpensive manner with an accommodation space, surrounding the internal through-opening, for accommodating a circuit element. This eliminates the need existing in the related art, of having to stick the circuit element onto a metallic base plate. Instead, circuit elements fitted on both sides may now also be disposed in the accommodation space, since the first plastic housing part may easily be provided with suitable retaining arrangement and accommodating arrangement to support and/or secure the circuit element at a distance from the bottom of the accommodation space.

For example, the accommodation space may advantageously have a bottom and a circumferential wall projecting from the bottom and forming the boundary of the accommodation space to the outside.

Besides the internal through-opening for the pressure-sensing element, in the bottom, additionally a through-cutout may easily be provided which is used to electrically contact a grounding spring, electrically connected to the circuit element, through the through-cutout to the pressure connector.

At the end of the circumferential wall projecting from the bottom, advantageously, a ledge may be formed, with which the second housing part engages. This permits a simple and inexpensive welding of the first plastic housing part to the second plastic housing part with the aid of an ultrasonic welding process, for example.

The connection area of the first housing part and the second housing part may be formed expediently in such a way that, viewed in the screw-in direction, the outer contour of the second housing part engages nearly flush with the outer case of the first housing part. This beneficially permits as smooth a transition as possible between the two housing parts at the outer case with, at most, very small steps or edges, which allows a fast and secure placement of the screw-in tool on the external drive of the outer case.

For example, in a cross-sectional plane perpendicular to the screw-in direction of the pressure connector, the geometrical shape of the outer case may be formed as a regular polygon and especially as a hexagonal contour.

BRIEF DESCRIPTION OF THE DRAWINGS

FIG. 3c shows a bottom view of the circuit substrate from FIG. 3a.

DETAILED DESCRIPTION

Figure 1:
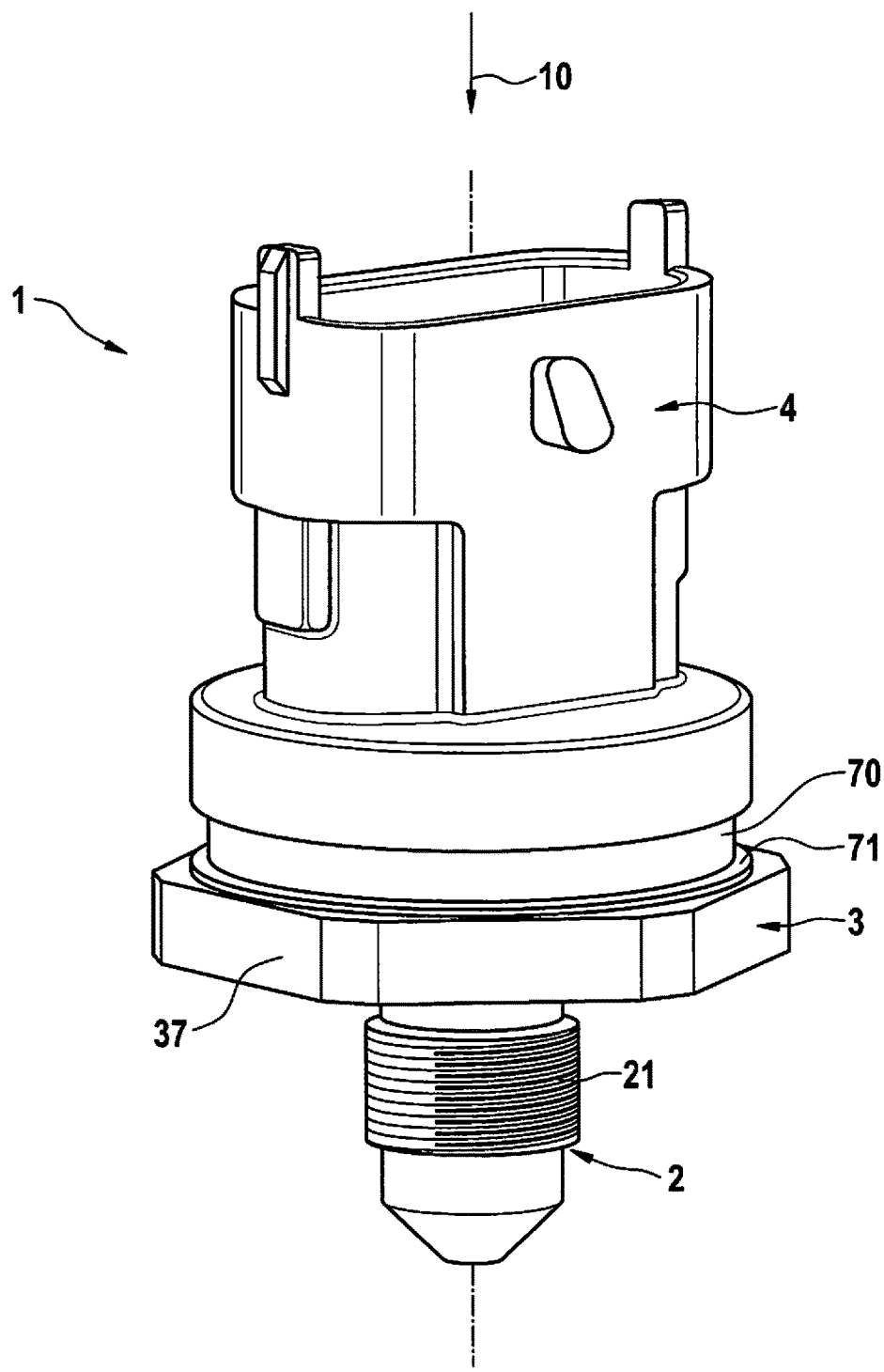
FIG. 1 shows a device for sensing a pressure according to the related art.

FIG. 1 shows an exterior view of the device for sensing a pressure of a fluid medium from the related art. Such a device 1 includes a sensor housing having a first housing part 3 and a second housing part 4. First housing part 3 is formed as a plate-shaped metal part, whose outer case 37 is provided as external drive for a screw-in tool having a hexagonal contour. A metallic pressure connector 2, provided with an external thread 21 and a non-discernable pressure channel, is joined to first housing part 3 by a welded connection. Second housing part 4 is formed as a male connector provided with electrical connections, and is produced as an injection-molded part from plastic. A joining part 70 in the form of a deep-drawn, thin-walled, sheet-metal part is embedded with one end section in the plastic of second housing part 4, and with end section 71 facing away from second housing part 4, is mounted on first housing part 3 and welded to it at a circumferential contact surface. By placing a screw-in tool on the hexagonal external drive of outer case 37, the device is able to be screwed with pressure connector 2 into an assigned pressure-measuring opening in a pressure line of a motor vehicle. Screw-in direction 10 runs along the center axis of the device in FIG. 1.

Figure 2A:
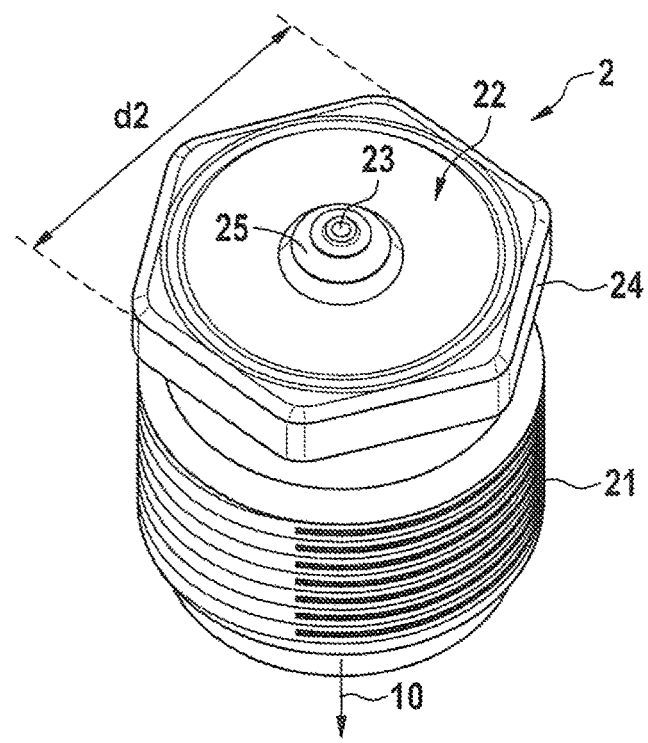
FIG. 2a shows a pressure connector for an exemplary embodiment of the device according to the present invention for sensing a pressure of a fluid medium.
Figure 2B:
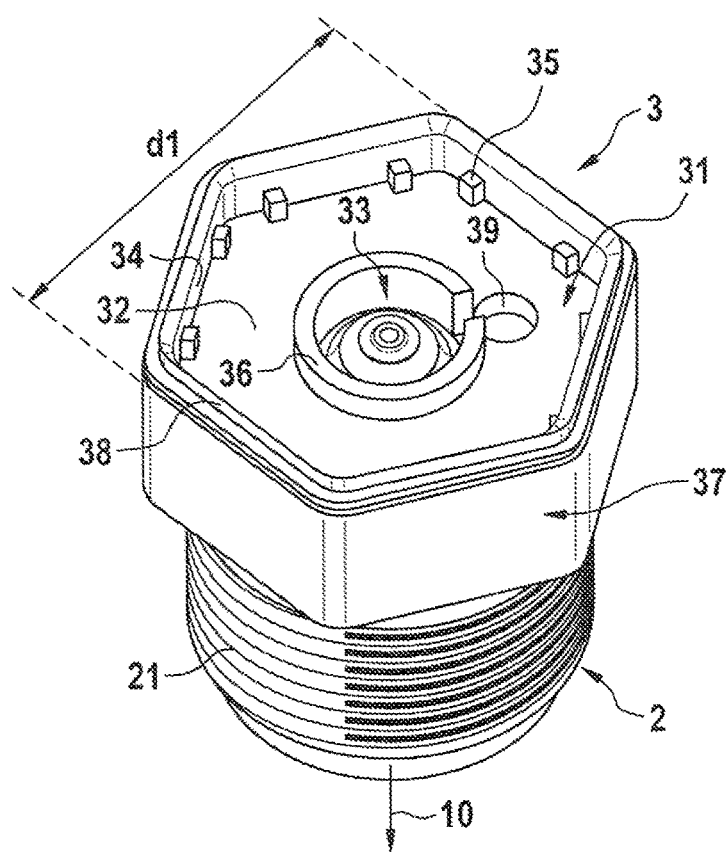
FIG. 2b shows the pressure connector from FIG. 2a in a state in which the first housing part is injection-molded as a plastic injection-molded part onto the pressure connector.

FIG. 2a and FIG. 2b show an exemplary embodiment of pressure connector 2 and first housing part 3 according to the present invention. In FIG. 2a, it can be seen that pressure connector 2 may be constructed of metal similarly to the pressure connector known from EP 1 518 099 B1 and may have an external thread 21, as well as a through-going pressure channel 23 that runs through pressure connector 2 and, for example, at the extremity at end face 22 of pressure connector 2, may lead into an opening on a projection 25. In contrast to the known pressure connector, pressure connector 2 shown in FIG. 2a has a collar-like support section 24. In a cross-sectional plane perpendicular to screw-in direction 10, support section 24 has a geometrical shape which, for example, corresponds to the hexagonal contour shown.

First housing part 3 of plastic is injection-molded around this pressure connector 2 in an injection-molding die. FIG. 2b shows the result. As one can see, on the lower part of pressure connector 2, external thread 21 continues to be exposed, while first housing part 3 is injection-molded as a plastic injection-molded part onto the upper part of pressure connector 2 in such a way that support section 24 is completely embedded in the plastic of first housing part 3. First plastic housing part 3 at least sectionally has a plastic outer case 37 formed as external drive with, e.g., a hexagonal contour. As shown, in the present advantageous exemplary embodiment, in the cross-sectional plane perpendicular to screw-in direction 10 of pressure connector 2, support section 24 embedded in the plastic has a geometrical shape corresponding to the geometrical shape of outer case 37 (namely, here, likewise a hexagonal contour) with a smaller diameter d2 compared to diameter d1 of the outer case. Naturally, the outer case of plastic may also be formed with an external drive which has a contour of another regular polygon or a different contour suitable for the engagement of a screw-in tool. Support section 24 may have a corresponding geometrical shape in these cases, as well.

However, in a different specific embodiment, the stability may also be achieved by the fact that support section 24 has a shape deviating from the geometrical shape of outer case 37. In the cross-sectional plane perpendicular to screw-in direction 10 of pressure connector 2, support section 24 advantageously has a non-circular contour in this instance, as well, in order to prevent first housing part 3 from shearing off when screwing in device 1. Thus, for example, it is conceivable to form the support section with radial projections or in a star shape in order to engage in toothlike fashion in the plastic of first housing part 3, and to increase stability during the screwing-in process.

Figure 3A:
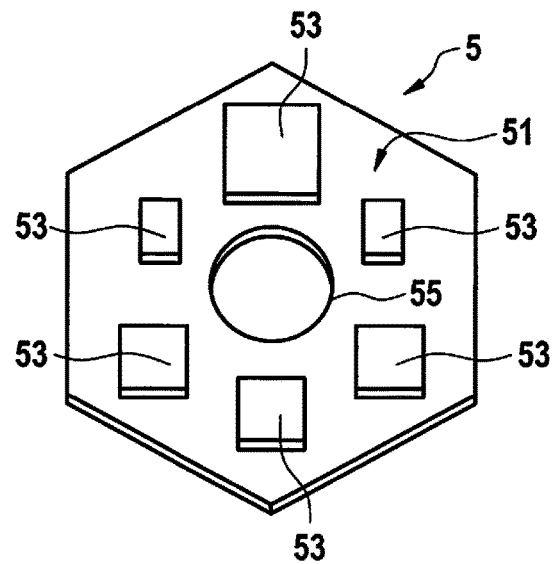
FIG. 3a shows an exemplary embodiment of a circuit substrate for the device according to the present invention.
Figure 3B:
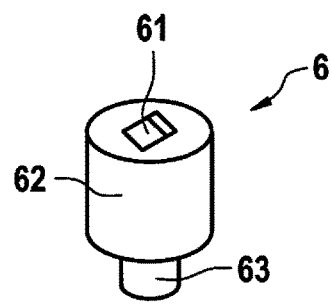
FIG. 3b shows an exemplary embodiment of a pressure-measuring cell.

In FIG. 2b, it can be seen that the side of first housing part 3 facing away from the pressure connector has an internal through-opening 33 for receiving a pressure-sensing element 6. As shown in FIG. 3b, the pressure-sensing element may take the form of a metallic pressure-measuring cell 62, similar to EP 1 518 099 B1, to which reference is explicitly made here. It has a blind-hole-type inner channel (not shown), which ends at a thin membrane. On the side of the membrane facing away from the blind-hole-type inner channel, a pressure sensor 61 is disposed which detects a deformation of the membrane in response to an application of pressure. On the opposite side, a projection 63 is formed. Projection 63 of pressure-measuring cell 6 may be welded to pressure connector 2 in the area of projection 25 of pressure connector 2, e.g., before or after injection-molding around pressure connector 2. In so doing, the blind-hole-type inner channel (not shown) is connected to pressure channel 23 of pressure connector 2. In principle, however, a differently formed pressure-sensing element 6 may also be used, which may be introduced into internal opening 33 and joined to pressure connector 2.

Moreover, for example, it is also very well possible to form the metallic pressure-measuring cell with the membrane in one piece with the pressure connector, and to mount a pressure sensor, for instance, in the form of a measuring bridge or sensor chip, directly on the pressure connector, that is, on the section of the pressure connector regarded as pressure-measuring cell. In this case, the pressure connector provided with the pressure sensor may be injection-molded around with the plastic of the first housing part. Also in this case, by injection-molding around it with plastic, the part of the pressure connector regarded as pressure-sensing element and provided with the pressure sensor is accommodated in an internal opening 33 of first housing part 3. In so doing, using suitable injection-molding dies, it is possible to prevent injection-molding material from penetrating into the area of the internal opening and getting onto the pressure sensor.

Figure 3C:
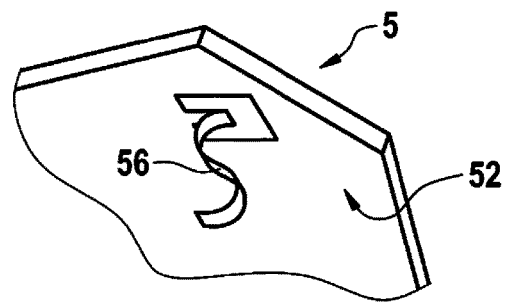

Furthermore, as discernible in FIG. 2b, on the side of first housing part 3 facing away from pressure connector 2, an accommodation space 31 surrounding internal through-opening 33 is formed for accommodating a circuit element 5. Accommodation space 31 has a bottom 32 and a circumferential wall 34 projecting from bottom 32 and forming the boundary of accommodation space 31 to the outside. In accommodation space 31, retaining arrangement 35, 36 are formed for the support and/or securing of circuit element 5 on first housing part 3. For example, these include bars 35 which are disposed at the edges of accommodation space 31 near wall 34, and an annular wall 36 which almost completely encircles internal opening 33. Circuit element 5 may be retained by retaining arrangement 35, 36 at a distance from bottom 32, thereby permitting the use of circuit elements 5 fitted with components on both sides. An example for a circuit element 5 which is usable in accommodation space 31 is shown in FIG. 3a. For instance, it may be a printed circuit board which is provided on top side 51 and/or bottom side 52 with electronic components 53 of an electrical evaluation circuit. Printed circuit board 5 may have a cutout 55 for the lead-through of pressure-sensing element 6; pressure-sensing element 6 may be joined to circuit element 5 via bonding wires, for example. As may also be seen in FIG. 2b, besides internal through-opening 33, bottom 32 of accommodation space 31 additionally has a through-cutout 39. For example, it may be provided to electrically contact an electrical grounding spring 56, shown in FIG. 3c and joined to circuit element 5 on its bottom side 52, through through-cutout 39 to metallic pressure connector 2, thereby making it possible to contact circuit element 5 to ground.

Furthermore, at the end of circumferential wall 34 projecting from bottom 32, a ledge 38 may be formed, with which second housing part 4 engages. Second housing part 4 (not further explained) may be produced from plastic with connector elements injected into it, thus, similarly to EP 1 518 099 B1, but without a joining part. For example, the connector elements (not shown) of second housing part 4 may be contacted to circuit substrate 5 via contact spring elements, similarly as described in EP 1 518 099 B1.

Second housing part 4 may be secured to first housing part 3 with the aid of ledge 38 and, additionally or alternatively, further arrangement of attachment. For instance, snap-in connections, clip-type connectors, welded connections or threaded connections or the like are conceivable here. In the exemplary embodiment, second housing part 4 is welded circumferentially to first housing part 3, e.g., by laser welding or ultrasonic welding, which may be accomplished particularly easily, since both housing parts are made of plastic.

Figure 4:
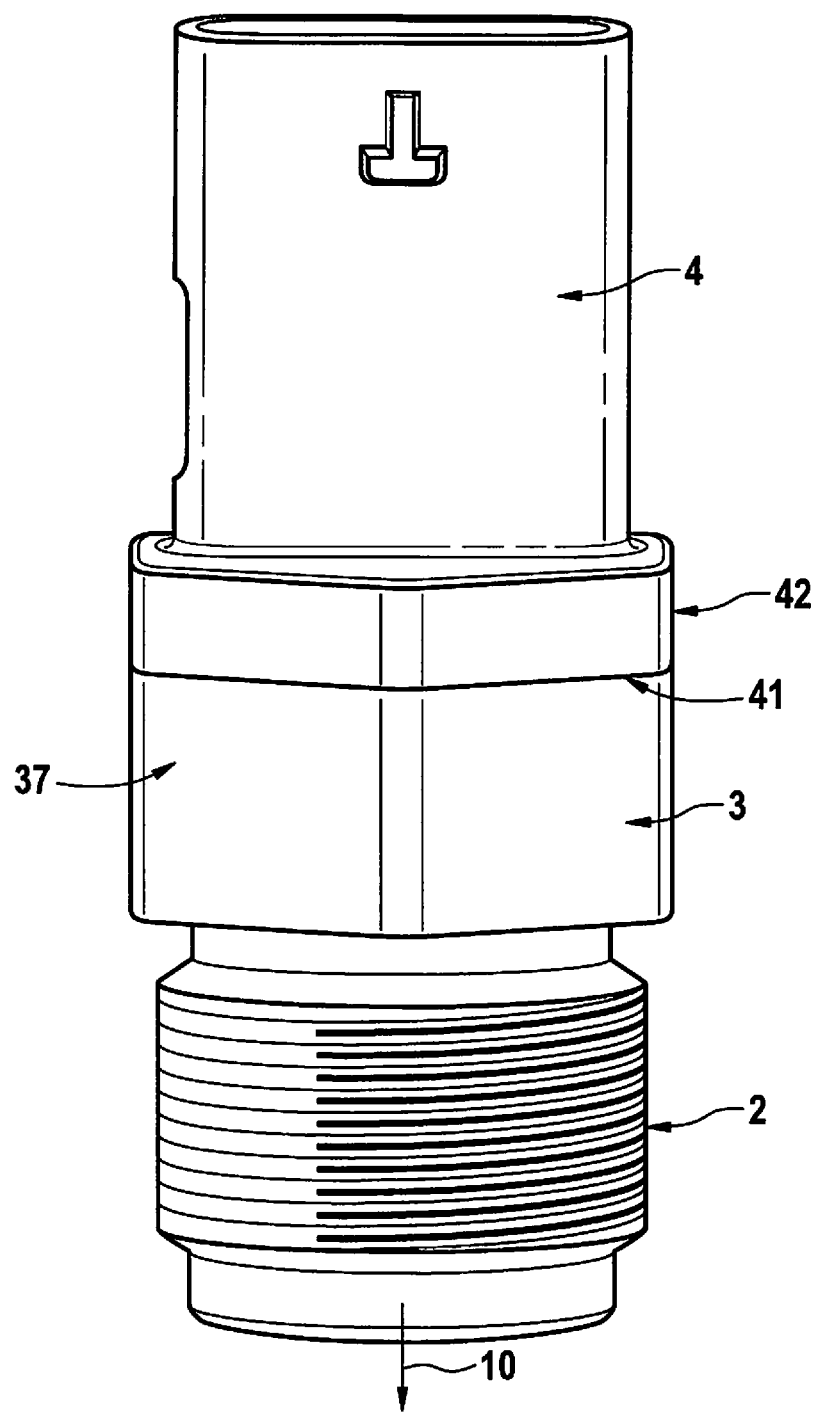
FIG. 4 shows an exterior view of the device according to the present invention in the assembled state.

The finished device is shown in FIG. 4. It is clearly discernible in FIG. 4 that connection area 41 of first housing part 3 and second housing part 4 may be formed in such a way that, viewed in screw-in direction 10, outer contour 42 of second housing part 4 engages nearly flush with outer case 37 of first housing part 3. Within the context of the present application, nearly flush means that a slight unevenness is quite possible because of the welding of the first housing part and second housing part, for example. Viewed in screw-in direction 10, between the two housing parts, there is a virtually smooth transition at the outer case without large steps or edges, which permits a rapid and more secure contact of the screw-in tool on the external drive of outer case 37, since the screw-in tool may easily be guided over outer contour 42. However, outer case 37 is formed so that, an engagement of the screw-in tool may take place solely on outer case 37 of first housing part 3, in order to prevent a shear stress from being generated in the joining area of the two housing parts during the screwing-in process. However, it is also possible not to form outer contour 42 flush with outer case 37, and instead, to provide a stepped transition.

What is claimed is:

1. A device for sensing a pressure of a fluid medium, comprising: a sensor housing that includes a plastic first housing part and a plastic second housing part, the first housing part being arranged at a first side of the second housing part; a metallic pressure connector that includes a metallic exterior thread and a metallic plate section above the exterior thread; and a pressure-sensing element disposed in the sensor housing, wherein: the second housing part includes an electrical connection connecting to a component housed in the first housing part and includes a first connector by which the second housing part mates with a corresponding second connector that is part of a component to be arranged at a second side of the second housing part for mechanical connection of the second housing part to the component to be arranged at the second side of the second housing part, the second side being opposite the first side, and one of the first and second connectors being a male connector and the other of the first and second connectors being a female connector; and the first housing part includes an outer case in the form of an external drive, and is plastic injection-molded onto and around the metallic plate section of the pressure connector.

2. The device of claim 1, wherein the metallic plate section of the pressure connector is a collar-like support section which is embedded in the plastic of the first housing part.

3. The device of claim 2, wherein in a cross-sectional plane perpendicular to a direction in which the pressure connector is screwed using the exterior thread, the support section embedded in the plastic has a same non-circular geometrical shape as a non-circular geometrical shape of the outer case, with a smaller diameter compared to a diameter of the outer case.

4. The device of claim 1, wherein a side of the first housing part facing away from the pressure connector has an internal through-opening for receiving the pressure-sensing element.

5. The device of claim 4, wherein the component housed in the first housing part is a circuit element, and, on the side of the first housing part facing away from the pressure connector, an accommodation space surrounding the internal through-opening is formed for accommodating the circuit element.

6. The device of claim 5, wherein the accommodation space has a bottom and a circumferential wall projecting from the bottom and forming an external boundary of the accommodation space.

7. The device of claim 6, wherein in addition to the internal through-opening, in the bottom, there is a through-cutout, which is provided to electrically contact a grounding spring, electrically connected to the circuit element, through the through-cutout to the pressure connector.

8. The device of claim 6, wherein at a top of the circumferential wall projecting from the bottom, there is a ledge, with which the second housing part engages.

9. The device of claim 5, wherein in the accommodation space, a retaining arrangement supports the circuit element on the first housing part.

10. The device of claim 9, wherein:
the accommodation space has an upward facing floor and a circumferential wall projecting upwards from the floor and forming an external boundary of the accommodation space;
the retaining arrangement includes at least one radially interior projection and at least one radially exterior projection that are radially interior to the circumferential wall and that project upwards from the floor; and
the circuit element is a plate-shaped element, a radially exterior edge of which lies on the at least one radially exterior projection and a radially interior edge of which lies on the at least one radially interior projection, so that there is a space between the floor and a bottom face of the circuit element in a region between the radially exterior and radially interior edges of the circuit element.

11. The device of claim 10, wherein the at least one radially exterior projection includes a plurality of bars or bumps, and the at least one radially interior projection is in the form of a circularly-shaped wall around at least a part of the internal through-opening.

12. The device of claim 1, wherein at a connection area at which the first housing part and the second housing part are connected to each other, an outer contour of the second housing part engages nearly flush with the outer case of the first housing part viewed in a direction in which the pressure connector is screwed using the exterior thread.

13. The device of claim 1, wherein in a cross-sectional plane perpendicular to a direction in which the pressure connector is screwed using the exterior thread, a geometrical shape of the outer case is a regular polygon.

14. The device of claim 1, wherein in a cross-sectional plane perpendicular to a direction in which the pressure connector is screwed using the exterior thread, a geometrical shape of the outer case is a hexagon.

15. The device of claim 1, wherein the first connector is the male connector and extends from a body of the second housing part at the second side of the second housing part in a direction away from the first housing part.

16. The device of claim 1, wherein in a cross-sectional plane perpendicular to a direction in which the pressure connector is screwed using the exterior thread, a geometrical shape of the metallic plate section of the pressure connector is a regular polygon.

17. The device of claim 16, wherein in the cross-sectional plane perpendicular to a direction in which the pressure connector is screwed using the exterior thread, a geometrical shape of the outer case is a regular polygon.

18. The device of claim 16, wherein in the cross-sectional plane perpendicular to a direction in which the pressure connector is screwed using the exterior thread, a geometrical shape of the outer case is a hexagon.

19. The device of claim 1, wherein in a cross-sectional plane perpendicular to a screw-in direction of the pressure connector, a geometrical shape of the metallic plate section of the pressure connector is a hexagon.

20. The device of claim 19, wherein in the cross-sectional plane perpendicular to a direction in which the pressure connector is screwed using the exterior thread, a geometrical shape of the outer case is a regular polygon.

21. The device of claim 20, wherein in the cross-sectional plane perpendicular to a direction in which the pressure connector is screwed using the exterior thread, a geometrical shape of the outer case is a hexagon.

* * * * *